United States Patent
Philipp

(10) Patent No.: US 6,580,877 B2
(45) Date of Patent: Jun. 17, 2003

(54) CYLINDRICAL COVERING CAP FOR EYEPIECE TUBES

(75) Inventor: Michael Philipp, Ottrau (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 10/096,965

(22) Filed: Mar. 14, 2002

(65) Prior Publication Data
US 2003/0095801 A1 May 22, 2003

(30) Foreign Application Priority Data
Nov. 21, 2001 (DE) .................... 201 19 000 U

(51) Int. Cl.⁷ .............................. G03B 13/02
(52) U.S. Cl. .................................. 396/373
(58) Field of Search ......................... 396/373, 448, 396/544; 359/600

(56) References Cited

U.S. PATENT DOCUMENTS 5,040,011 A  * 8/1991 Tiffen ......................... 396/544
5,623,367 A  * 4/1997 Immel ......................... 359/600

FOREIGN PATENT DOCUMENTS

| AT | 246 452   | 4/1966 |
| DE | 76 30 717 | 2/1977 |
| FR | 2 296 863 | 7/1976 |
| JP | 8-190059  | 7/1996 |

* cited by examiner

Primary Examiner—David Gray
(74) Attorney, Agent, or Firm—Foley & Lardner

(57) ABSTRACT

A cylindrical covering cap for an eyepiece tube, the eyepiece tube having a conical soft eyecup, includes, in a cylindrical interior of the covering cap: two mutually opposite segment regions having a segment region inside radius that is greater than an inner aperture radius of the covering cap; and at least two mutually opposite segment surfaces, which may be circumferentially spaced so that the locations of the segment surfaces are approximately symmetric about a segment region axis that passes through a center of each of the segment regions. A shortest distance from each segment surface to a cylinder axis may be smaller than the inner aperture radius of the covering cap, and the inner aperture radius of the covering cap may be configured to adapt to a larger outside radius of the conical eyecup. The segment surfaces may be substantially flat or have a substantially cylindrical curvature.

16 Claims, 3 Drawing Sheets

CYLINDRICAL COVERING CAP FOR EYEPIECE TUBES

CROSS-REFERENCE TO RELATED PATENT APPLICATIONS

This invention claims priority to German Utility Model Application 201 19 000.1, filed on Nov. 21, 2001, which is incorporated herein by reference in its entirety.

FIELD OF THE INVENTION

The present invention relates to a cylindrical covering cap for eyepiece tubes, having a conical soft eyecup, the inner aperture radius R1 of the covering cap being adapted to the larger outside radius RK of the cone of the eyecup.

BACKGROUND OF THE INVENTION

Covering caps of this type are generally known. They usually consist of plastic and are pushed onto the eyepiece tube. Given a suitable pressure, they are clamped onto the cone of the eyecup (with the aid of the coating, which is soft like rubber) so firmly as to prevent it from falling off inadvertently. However, clamping frequently occurs that is so firm that the covering cap may be detached only by a forceful tug. In this process, the soft coating of the eyecup can also be taken off. In an attempt to detach the covering cap by rotation, rotatable eyecups for eyepieces for spectacle wearers are partially rotated out of their end click stops and detached from the eyepiece tube. It is also disadvantageous that on being gripped during detachment the covering cap is initially pressed even more firmly onto the eyecup.

SUMMARY OF THE INVENTION

An object of the present invention is to solve these and other problems by specifying a covering cap which, on the one hand, is securely seated on the eyepiece tube simply by being pushed on and, on the other hand, can be detached without damaging the eyecup.

The present invention provides for a cylindrical covering cap for an eyepiece tube, the eyepiece tube having a conical soft eyecup, which comprises, in a cylindrical interior of the covering cap: two mutually opposite segment regions having a segment region inside radius R2 that is greater than an inner aperture radius R1 of the covering cap; and at least two mutually opposite segment surfaces, wherein a shortest distance A from a segment surface to a cylinder axis passing through a center of the covering cap is smaller than the inner aperture radius of the covering cap, and wherein the inner aperture radius R1 of the covering cap is configured to adapt to a larger outside radius RK of the conical eyecup. The segment surfaces may be circumferentially spaced so that the locations of the segment surfaces are approximately symmetric about a segment region axis that passes through a center of each of the segment regions. The locations of the segment surfaces may be approximately symmetric about a perpendicular axis that is perpendicular to the segment region axis and intersects the segment region axis at the cylinder axis. The shortest distance A for each segment surface may be approximately equal for all segment surfaces.

In one aspect of the present invention, the covering cap may comprise four segment surfaces.

In another aspect of the present invention, the segment surfaces may be substantially flat or have a substantially cylindrical curvature.

In another aspect of the present invention, where the covering cap has a conical cylindrical shape, the segment surfaces may be conically inclined to a cap closure of the covering cap with respect to the cylinder axis.

In another aspect of the present invention, a difference (R2−R1) between the segment region inside radius R2 and the inner aperture radius R1 may be approximately equal to a wall thickness D of the covering cap. Further, a difference (R1−A) between the inner aperture radius R1 and said shortest distance A is approximately equal to the wall thickness D of the covering cap. The wall thickness of the covering cap may be approximately 1 mm.

In another aspect of the present invention, the segment regions may be marked on an outer surface of the covering cap by a ribbed surface structure configured to be gripped.

In another aspect of the present invention, the wall thickness D of the covering cap and a material composition of the covering cap may be coordinated with one another such that the covering cap can be deformed elastically.

In another aspect of the present invention, a circumferential angle between two adjacent segment surfaces may be smaller than a circumferential angle between a segment surface and an adjacent segment region.

In another aspect of the present invention, a circumferential segment region angle, which is the largest continuous angle that includes one segment region but does not include a segment surface, may be greater than a circumferential segment surface angle, which is the largest angle including only adjacent segment surfaces and the angle between them.

The present invention also provides for a cylindrical covering cap for an eyepiece tube, the eyepiece tube having a conical soft eyecup, comprising, in a cylindrical interior of the covering cap: two mutually opposite segment regions having a segment region inside radius that is greater than an inner aperture radius of the covering cap; and at least two mutually opposite segment surfaces that are circumferentially spaced so that the locations of the segment surfaces are approximately symmetric about a segment region axis that passes through a center of each of the segment regions, wherein a shortest distance from a segment surface to a cylinder axis passing through a center of the covering cap is smaller than the inner aperture radius of the covering cap, wherein the inner aperture radius of the covering cap is configured to adapt to a larger outside radius of the conical eyecup, wherein the locations of the segment surfaces are approximately symmetric about a perpendicular axis that is perpendicular to the segment region axis and intersects the segment region axis at the cylinder axis, wherein a circumferential angle between two adjacent segment surfaces is smaller than a circumferential angle between a segment surface and an adjacent segment region, and wherein a circumferential segment region angle, which is the largest continuous angle that includes one segment region but does not include a segment surface, is greater than a circumferential segment surface angle, which is the largest angle including only adjacent segment surfaces and the angle between them.

BRIEF DESCRIPTION OF THE DRAWINGS

An exemplary embodiment of the covering cap according to the present invention is illustrated schematically in the drawings.

DETAILED DESCRIPTION OF THE PREFERRED EMBODIMENTS

Figure 1:
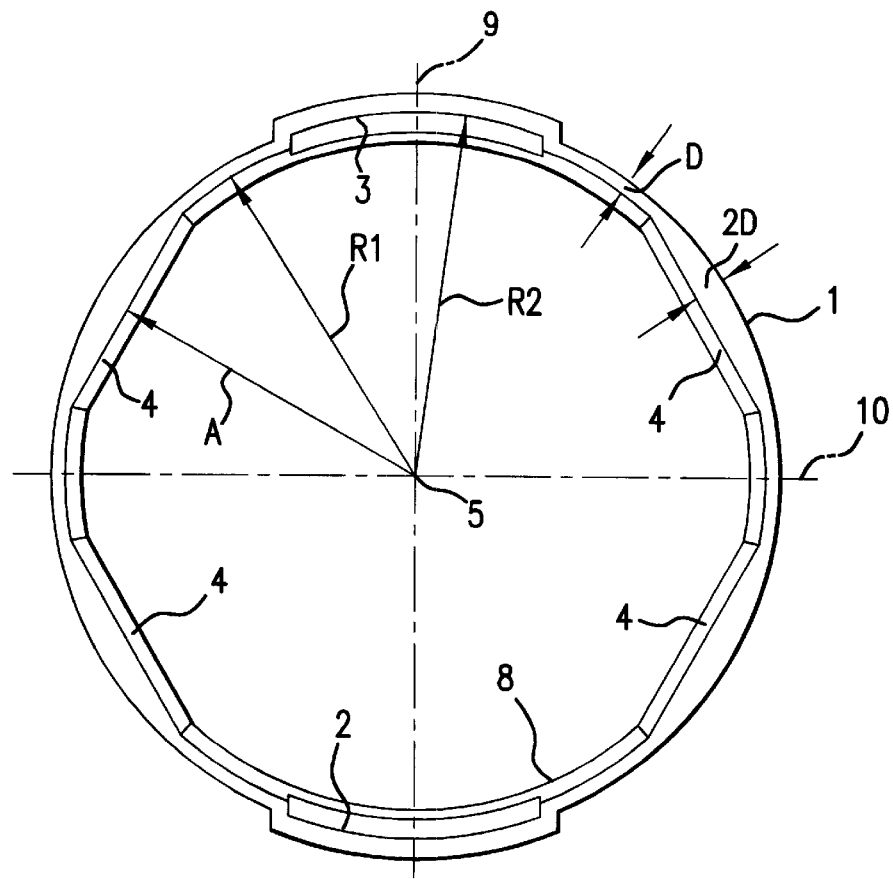
FIG. 1 shows a bottom view and the opening of the covering cap with flat segment surfaces.
Figure 2:
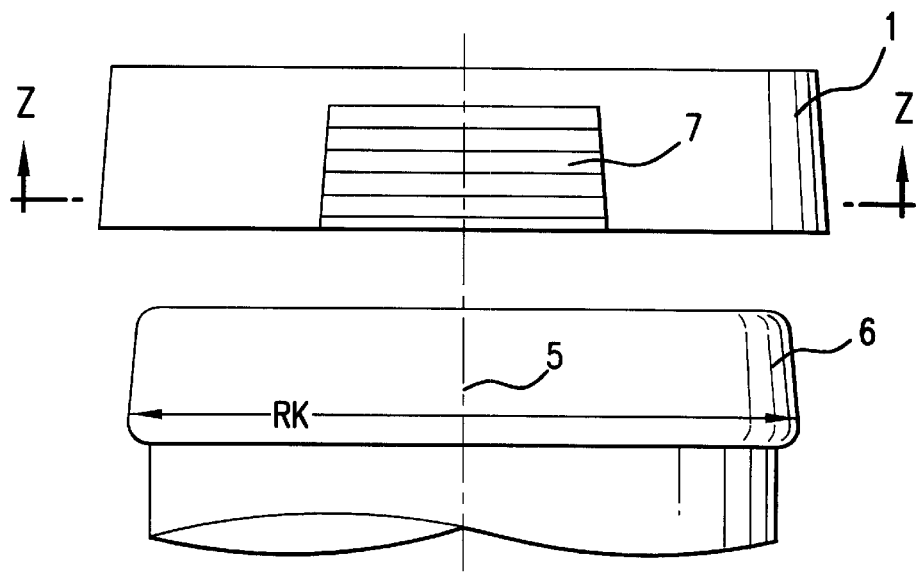
FIG. 2 shows a side view of the covering cap with an eyecup.

The covering cap 1 illustrated in FIG. 1 is conically cylindrical in longitudinal section (as shown in FIG. 2) with an inner aperture radius R1 and a wall thickness D. Formed in the cylindrical interior of the covering cap 1 are two mutually opposite segment regions 2, 3 having a segment region inside radius R2 which is larger than inner aperture radius R1. ("Mutually opposite," as used herein, means "located approximately symmetrically about the cylinder axis 5." For example, two segment regions 2, 3 that are center-mirrored, or mirrored about the center of the covering cap 1, would be mutually opposite, because they would be located approximately symmetrically about the cylinder axis 5, which passes through the center of the covering cap 1.) The part of the cylindrical interior that is situated between these segment regions 2, 3 has two pairs of flat segment surfaces 4, each pair of which is mutually opposite. The segment surfaces 4 are circumferentially spaced about the cylindrical interior of the covering cap 1 so that the locations of the segment surfaces 4 are approximately symmetric about the segment region axis 9 (that passes through the centers of the segment regions 4) and about the perpendicular axis 10 (that is perpendicular to the segment region axis 9 and intersects the segment region axis 9 at the cylinder axis 5). The shortest distance A from these segment surfaces 4 to the cylinder axis 5 may be smaller than the inner aperture radius R1. The wall thickness D of the covering cap 1 may therefore be greater in the locations of the segment surfaces 4 than in the remaining locations.

Figure 4:
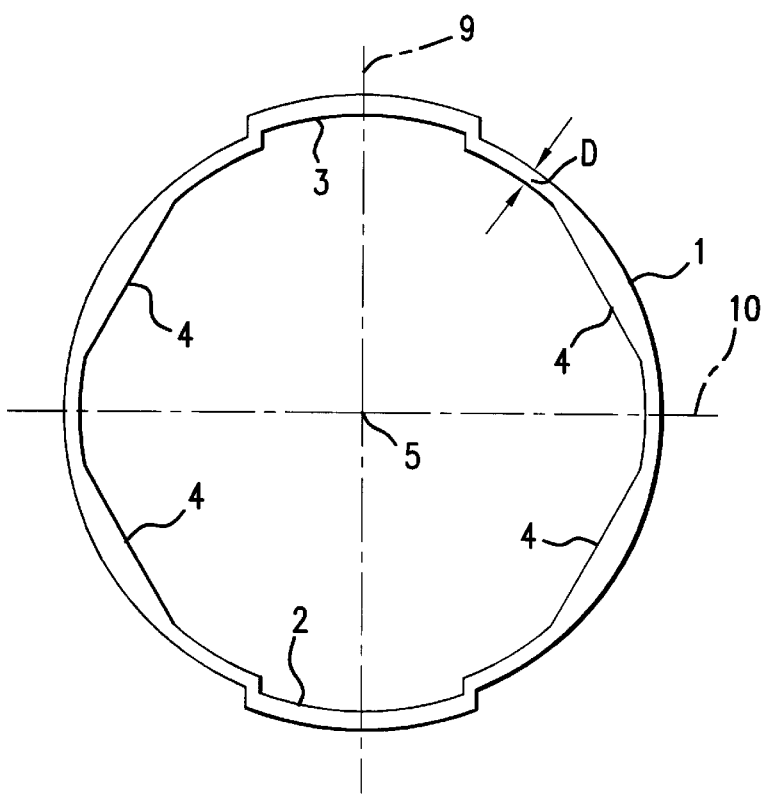
FIG. 4 shows a cross sectional view of the covering cap as shown along section Z—Z in FIG. 2.

FIG. 4 shows a cross sectional view along section Z—Z of FIG. 2. FIG. 4 is very similar to FIG. 1, differing primarily in that the depth of the covering cap, and its corresponding cap closure 8, are not shown in FIG. 4. FIG. 4 is intended to clarify the shape and dimensional relationships among segment regions 2, 3 and the segment surfaces 4.

Figure 3:
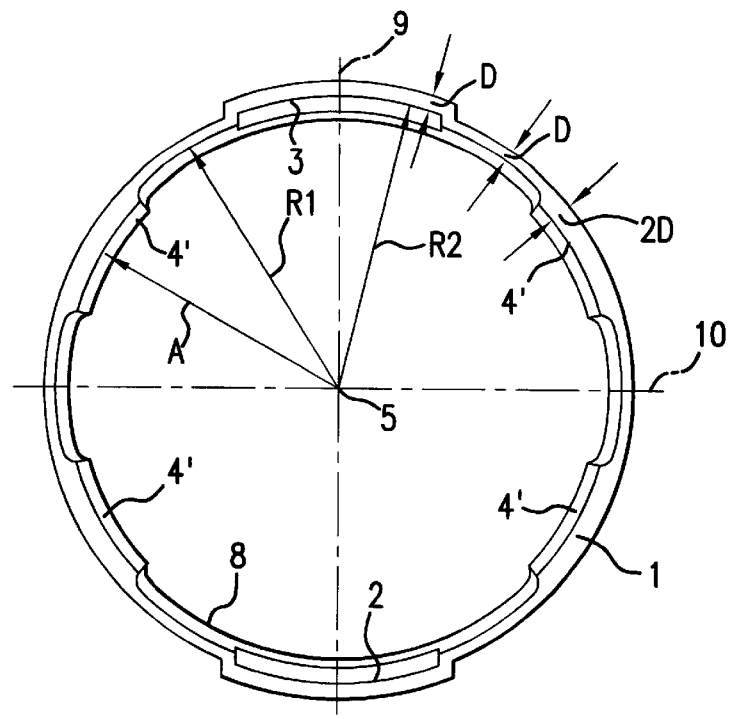
FIG. 3 shows a bottom view and the opening of the covering cap with segment surfaces having a cylindrical curvature.

Referring now to FIG. 3, instead of the flat segment surfaces 4 formed as chordal surfaces in the cylindrical interior of the covering cap 1, it is also possible to provide cylindrical segment surfaces 4' (having an approximately cylindrical curvature), having an inside radius A. In this embodiment inside radius A is also the shortest distance A from these segment surfaces 4' to the cylinder axis 5. In the case of a conical configuration of the covering cap 1, the segment surfaces 4, 4' may be conically inclined toward the cap closure 8 with reference to the cylinder axis 5.

In mounting the covering cap 1 on a conical eyecup 6 (as shown in FIG. 2) of an eyepiece tube, the segment surfaces 4, 4' are situated on the soft coating of the eyecup 6. When pushed on further, the segment surfaces 4, 4' are pushed radially outward, the covering cap 1 being deformed in cross section. The elastic stress produced in the process inside the covering cap 1 ensures a firm seat of the covering cap 1 on the eyecup 6, without damaging the latter.

In order to remove the covering cap 1, a radial inwardly directed pressure may be exerted on the segment regions 2, 3 from the outside. As shown in FIG. 2, owing to a longitudinal fluting or ribbed surface structure 7, segment regions 2, 3 may be felt from outside as well as fashioned suitably for gripping in order to lift the covering cap 1 from the eyecup 6. The pressure on the segment regions 2, 3 likewise produces an elastic deformation of the covering cap 1 by means of which the segment surfaces 4, 4' may be detached from the eyecup 6.

Figure 5:
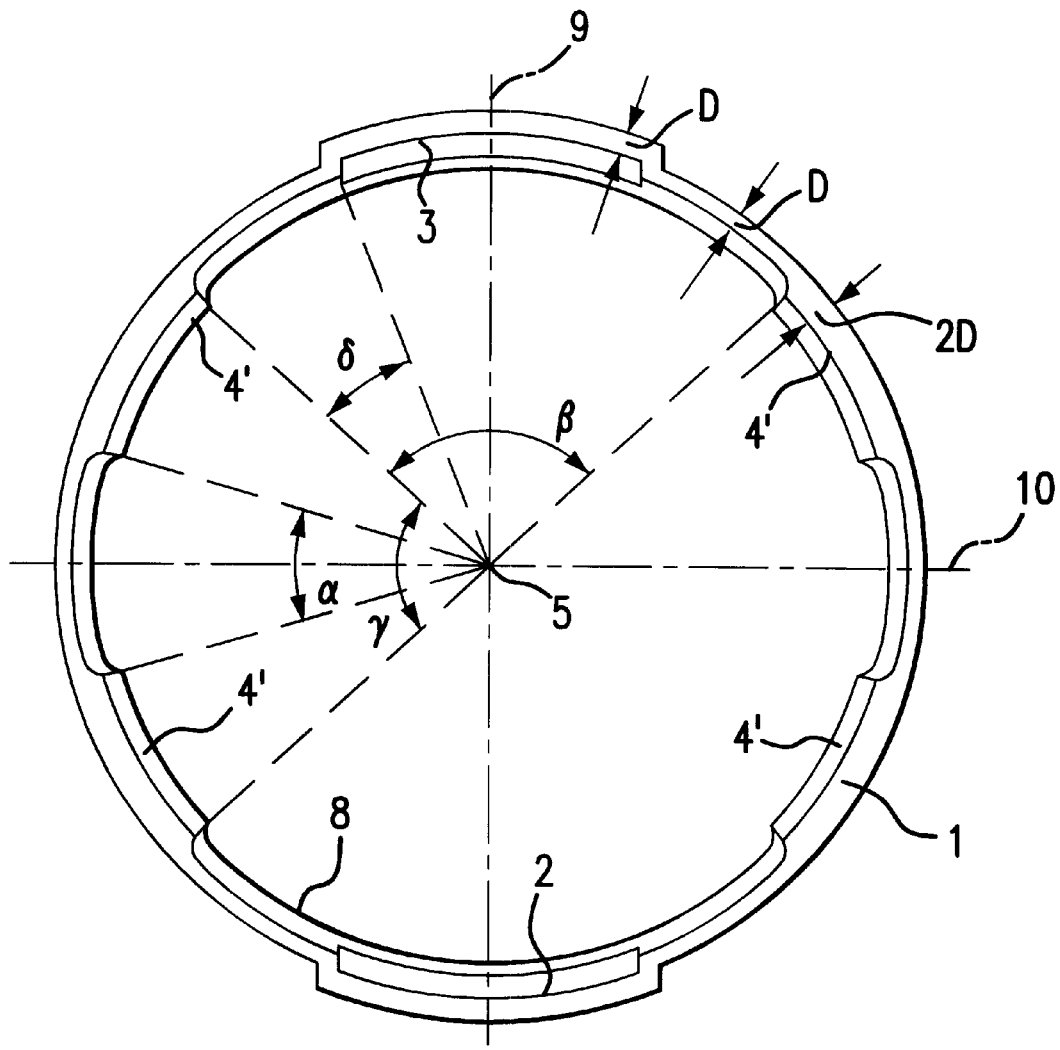
FIG. 5 shows the angles α, β, Γ, and δ of the embodiment as shown in FIG. 3.

Referring now to FIG. 5, in one embodiment of the present invention, the segment surfaces 4, 4' may be situated closer to one another on the circumference of the cylindrical interior of the covering cap 1 than in the direction of the segment regions 2, 3. In other words, a circumferential angle a between two adjacent segment surfaces 4, 4' may be smaller than a circumferential angle δ between a segment surface 4, 4' and an adjacent segment region 2, 3. Further, a circumferential segment surface angle y may be smaller than a circumferential segment region angle β, as shown in FIG. 5. The circumferential segment region angle β, also known as a free angle (because it is free of a protruding segment surface 4, 4'), is the largest continuous angle that includes one segment region 2, 3 but does not include a segment surface 4, 4', as shown in FIG. 5. The circumferential segment surface angle γ is the largest angle including only adjacent segment surfaces 4, 4' and the angles between them—i.e., as shown in FIG. 5, the circumferential segment surface angle γ does not include any segment regions 2, 3. The relationships among angles α, β, γ, and δ help to ensure that the necessary amount of radial, inwardly-directed pressure that must be applied to segment regions 2, 3 (via ribbed surface structures 7), in order to deform the covering cap 1 sufficiently to remove it from the eyecup 6, is minimized. In short, the farther the segment surfaces 4, 4' are from the segment regions 2, 3, and the closer they are to each other, the easier it is to deform the covering cap 1 sufficiently to remove it from the eyecup 6.

The distance (R2−R1) of the segment regions 2, 3 from the eyecup 6 ensures that the eyecup 6 is not touched by the segment regions 2, 3 when the segment regions 2, 3 are compressed. The covering cap 1 can easily be removed in this way.

The stability of the pressure surfaces (e.g., segment surfaces 4, 4') and the elasticity of the covering cap 1 in all remaining parts are important for the proper operation of the covering cap 1. The elasticity is a function of the ratio of the thicknesses of the wall, the segment regions, and the segment surfaces. In a preferred embodiment of the present invention, the flat segment surfaces 4 (in their middle or, otherwise, thickest points) and the cylindrical segment surfaces 4' may have a thickness approximately double the wall thickness D. Further, the segment regions 2, 3 may have a thickness approximately equal to the wall thickness D. Further still, the difference (R2−R1), corresponding to the free space for pressing in the segment regions 2, 3, may also be approximately equal to the wall thickness D. The actual wall thickness D may depend on the material from which the covering cap 1 is produced. A wall thickness D of approximately 1 mm has proved to be favorable for production as an injection-molded plastic part.

The operation of the present invention according to a preferred embodiment will now be described. To cover an eyecup 6 of an eyepiece tube, as shown in FIG. 2, a covering cap 1 may be pushed onto the eyecup 6, with the opening of the covering cap 1 facing the eyecup 6. As the covering cap 1 is being pushed onto the eyecup 6, the outer portion of the eyecup 6, which may have a diameter RK that is slightly larger than the shortest distance A (shown in FIG. 1), exerts a radial pressure on the segment surfaces 4, 4'. As pressure is exerted on segment surfaces 4, 4', the covering cap 1, made of an appropriate material and having appropriate dimensions, elastically deforms, allowing the segment surfaces 4, 4' to be pushed radially outward. In this deformed state, the segment surfaces 4, 4' of the covering cap 1 continue to exert a pressure or normal force against the eyecup 6, generating a friction between the segment surfaces 4, 4' of the covering cap 1 and the eyecup 6 that holds the covering cap 1 in place on the eyecup 6.

To remove the covering cap 1, a radial pressure may be inwardly exerted by a human user or operator onto the ribbed surface structures 7 (each of which corresponds to and is located on an exterior side of one of the segment regions 2, 3). In doing so, the covering cap 1 elastically deforms so that the segment regions 2, 3 move radially inwardly (toward the eyecup 6) while the segment surfaces 4, 4' are forced radially outwardly (away from the eyecup 6), thus reducing or relieving the pressure/normal force between the segment surfaces 4, 4' and the eyecup 6. At this point, the covering cap 1 may be lifted off the eyecup 6 without risk of damaging the eyecup 6.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

What is claimed is:

1. A cylindrical covering cap for an eyepiece tube, the eyepiece tube having a conical soft eyecup, comprising, in a cylindrical interior of the covering cap:
   two mutually opposite segment regions having a segment region inside radius that is greater than an inner aperture radius of the covering cap; and
   at least two mutually opposite segment surfaces,
   wherein a shortest distance from a segment surface to a cylinder axis passing through a center of the covering cap is smaller than the inner aperture radius of the covering cap, and
   wherein the inner aperture radius of the covering cap is configured to adapt to a larger outside radius of the conical eyecup.

2. The covering cap as claimed in claim 1, wherein the segment surfaces are circumferentially spaced so that the locations of the segment surfaces are approximately symmetric about a segment region axis that passes through a center of each of the segment regions.

3. The covering cap as claimed in claim 2, wherein the locations of the segment surfaces are approximately symmetric about a perpendicular axis that is perpendicular to the segment region axis and intersects the segment region axis at the cylinder axis.

4. The covering cap as claimed in claim 1, wherein the segment surfaces are substantially flat.

5. The covering cap as claimed in claim 1, wherein the segment surfaces have a substantially cylindrical curvature.

6. The covering cap as claimed in claim 1, wherein the segment surfaces are conically inclined to a cap closure of the covering cap with respect to the cylinder axis.

7. The covering cap as claimed in claim 1, wherein a difference between the segment region inside radius and the inner aperture radius is approximately equal to a wall thickness of the covering cap.

8. The covering cap as claimed in claim 1, wherein a difference between the inner aperture radius and said shortest distance is approximately equal to a wall thickness of the covering cap.

9. The covering cap as claimed in claim 1, wherein a wall thickness of the covering cap is approximately 1 mm.

10. The covering cap as claimed in claim 1, wherein the segment regions are marked on an outer surface of the covering cap by a ribbed surface structure configured to be gripped.

11. The covering cap as claimed in claim 1, wherein a wall thickness of the covering cap and a material composition of the covering cap are coordinated with one another such that the covering cap can be deformed elastically.

12. The covering cap as claimed in claim 1, wherein a shortest distance from each segment surface to the cylinder axis is approximately equal for all segment surfaces.

13. The covering cap as claimed in claim 1, comprising four segment surfaces.

14. The covering cap as claimed in claim 1, wherein a circumferential angle between two adjacent segment surfaces is smaller than a circumferential angle between a segment surface and an adjacent segment region.

15. The covering cap as claimed in claim 1, wherein a circumferential segment region angle, which is the largest continuous angle that includes one segment region but does not include a segment surface, is greater than a circumferential segment surface angle, which is the largest angle including only adjacent segment surfaces and the angle between them.

16. A cylindrical covering cap for an eyepiece tube, the eyepiece tube having a conical soft eyecup, comprising, in a cylindrical interior of the covering cap:
   two mutually opposite segment regions having a segment region inside radius that is greater than an inner aperture radius of the covering cap; and
   at least two mutually opposite segment surfaces that are circumferentially spaced so that the locations of the segment surfaces are approximately symmetric about a segment region axis that passes through a center of each of the segment regions,
   wherein a shortest distance from a segment surface to a cylinder axis passing through a center of the covering cap is smaller than the inner aperture radius of the covering cap,
   wherein the inner aperture radius of the covering cap is configured to adapt to a larger outside radius of the conical eyecup,
   wherein the locations of the segment surfaces are approximately symmetric about a perpendicular axis that is perpendicular to the segment region axis and intersects the segment region axis at the cylinder axis,
   wherein a circumferential angle between two adjacent segment surfaces is smaller than a circumferential angle between a segment surface and an adjacent segment region, and
   wherein a circumferential segment region angle, which is the largest continuous angle that includes one segment region but does not include a segment surface, is greater than a circumferential segment surface angle, which is the largest angle including only adjacent segment surfaces and the angle between them.

* * * * *